United States Patent
Feng et al.

(10) Patent No.: US 9,280,693 B2
(45) Date of Patent: Mar. 8, 2016

(54) INDICIA-READER HOUSING WITH AN INTEGRATED OPTICAL STRUCTURE

(71) Applicant: Hand Held Products, Inc., Fort Mill, SC (US)

(72) Inventors: Chen Feng, Snohomish, WA (US); Erik Van Horn, Ocean View, NJ (US); Tao Xian, Bordentown, NJ (US); Edward C. Bremer, Victor, NY (US); Sean Philip Kearney, Marlton, NJ (US); Mehul Patel, Newton, PA (US); Gregory Rueblinger, Stratford, NJ (US); Timothy Good, Clementon, NJ (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 14/276,264

(22) Filed: May 13, 2014

(65) Prior Publication Data

US 2015/0332076 A1    Nov. 19, 2015

(51) Int. Cl.
*G06K 7/10* (2006.01)
*G06K 7/015* (2006.01)

(52) U.S. Cl.
CPC ............ *G06K 7/10881* (2013.01); *G06K 7/015* (2013.01); *G06K 7/10831* (2013.01)

(58) Field of Classification Search
CPC .......... G06K 7/10722; G06K 7/10732; G06K 7/10821; G06K 7/10831; G06K 7/10881; G06K 7/12; G06K 7/14; G06K 2019/06225; G06K 2207/1011; G06K 2207/1012; G06K 7/10; G06K 7/10564; G06K 7/10574; G06K 7/10584; G06K 7/10702
USPC ........................................ 235/472.01–472.03
See application file for complete search history.

(56) References Cited

U.S. PATENT DOCUMENTS

| | | | |
|---|---|---|---|
| 6,669,093 B1 * | 12/2003 | Meyerson et al. | 235/472.01 |
| 6,832,725 B2 | 12/2004 | Gardiner et al. | |
| 7,128,266 B2 | 10/2006 | Marlton et al. | |
| 7,159,783 B2 | 1/2007 | Walczyk et al. | |
| 7,413,127 B2 | 8/2008 | Ehrhart et al. | |
| 7,726,575 B2 | 6/2010 | Wang et al. | |
| 8,061,617 B2 * | 11/2011 | Gillet et al. | 235/462.36 |
| 8,294,969 B2 | 10/2012 | Plesko | |
| 8,317,105 B2 | 11/2012 | Kotlarsky et al. | |

(Continued)

FOREIGN PATENT DOCUMENTS

EP        2538680 A2    12/2012
WO    2013163789 A1    11/2013

(Continued)

OTHER PUBLICATIONS

U.S. Appl. No. 13/367,978, filed Feb. 7, 2012, (Feng et al.); now abandoned.

(Continued)

*Primary Examiner* — Seung Lee
(74) *Attorney, Agent, or Firm* — Additon, Higgins & Pendleton, P.A.

(57) ABSTRACT

An imaging engine for an indicia reader that includes a dual-purposed housing is disclosed. The housing is configured to provide support and alignment for the imaging engine's optical modules. In addition, the housing includes an integrated optical structure to focus or project light to or from the various optical modules.

20 Claims, 2 Drawing Sheets

(56) References Cited

U.S. PATENT DOCUMENTS

| | | |
|---|---|---|
| 8,322,622 B2 | 12/2012 | Suzhou et al. |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,632,201 B2 * | 1/2014 | Gilbert et al. ................. 362/97.1 |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 9,010,643 B2 * | 4/2015 | Madej et al. ............. 235/462.41 |
| 2003/0080188 A1 | 5/2003 | Carlson et al. |
| 2006/0109365 A1 * | 5/2006 | Lee ............................. 348/335 |
| 2007/0063048 A1 | 3/2007 | Havens et al. |
| 2008/0185432 A1 | 8/2008 | Caballero et al. |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0138685 A1 | 6/2012 | Qu et al. |
| 2012/0168511 A1 | 7/2012 | Kotlarsky et al. |
| 2012/0168512 A1 | 7/2012 | Kotlarsky et al. |
| 2012/0193407 A1 | 8/2012 | Barten |
| 2012/0193423 A1 | 8/2012 | Samek |
| 2012/0203647 A1 | 8/2012 | Smith |
| 2012/0223141 A1 | 9/2012 | Good et al. |
| 2012/0228382 A1 | 9/2012 | Havens et al. |
| 2012/0248188 A1 | 10/2012 | Kearney |
| 2013/0043312 A1 | 2/2013 | Van Horn |
| 2013/0056285 A1 | 3/2013 | Meagher |
| 2013/0070322 A1 | 3/2013 | Fritz et al. |
| 2013/0075168 A1 | 3/2013 | Amundsen et al. |
| 2013/0082104 A1 | 4/2013 | Kearney et al. |
| 2013/0175341 A1 | 7/2013 | Kearney et al. |
| 2013/0175343 A1 | 7/2013 | Good |
| 2013/0200158 A1 | 8/2013 | Feng et al. |
| 2013/0214048 A1 | 8/2013 | Wilz |
| 2013/0256418 A1 | 10/2013 | Havens et al. |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0278425 A1 | 10/2013 | Cunningham et al. |
| 2013/0287258 A1 | 10/2013 | Kearney |
| 2013/0292474 A1 | 11/2013 | Xian et al. |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306730 A1 | 11/2013 | Brady et al. |
| 2013/0306731 A1 | 11/2013 | Pedrao |
| 2013/0306734 A1 | 11/2013 | Xian et al. |
| 2013/0307964 A1 | 11/2013 | Bremer et al. |
| 2013/0308625 A1 | 11/2013 | Corcoran |
| 2013/0313324 A1 | 11/2013 | Koziol et al. |
| 2013/0313325 A1 | 11/2013 | Wilz et al. |
| 2013/0313326 A1 | 11/2013 | Ehrhart |
| 2013/0327834 A1 | 12/2013 | Hennick et al. |
| 2013/0334314 A1 * | 12/2013 | Vinogradov et al. ..... 235/462.21 |
| 2013/0341399 A1 | 12/2013 | Xian et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008430 A1 | 1/2014 | Soule et al. |
| 2014/0008439 A1 | 1/2014 | Wang |
| 2014/0021256 A1 | 1/2014 | Qu et al. |
| 2014/0025584 A1 | 1/2014 | Liu et al. |
| 2014/0027518 A1 | 1/2014 | Edmonds et al. |
| 2014/0034723 A1 | 2/2014 | Van Horn et al. |
| 2014/0034734 A1 | 2/2014 | Sauerwein |
| 2014/0036848 A1 | 2/2014 | Pease et al. |

(56) References Cited

U.S. PATENT DOCUMENTS

| | | |
|---|---|---|
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061305 A1 | 3/2014 | Nahill et al. |
| 2014/0061306 A1 | 3/2014 | Wu et al. |
| 2014/0061307 A1 | 3/2014 | Wang et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0075846 A1 | 3/2014 | Woodburn |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0084068 A1 | 3/2014 | Gillet et al. |
| 2014/0086348 A1 | 3/2014 | Peake et al. |
| 2014/0097249 A1 | 4/2014 | Gomez et al. |
| 2014/0098284 A1 | 4/2014 | Oberpriller et al. |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Li et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Ding et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |
| 2014/0133379 A1 | 5/2014 | Wang et al. |
| 2014/0140585 A1 | 5/2014 | Wang |
| 2014/0151453 A1 | 6/2014 | Meier et al. |
| 2014/0160329 A1 | 6/2014 | Ren et al. |

FOREIGN PATENT DOCUMENTS

| | | |
|---|---|---|
| WO | 2013173985 A1 | 11/2013 |
| WO | 2014019130 A1 | 2/2014 |

OTHER PUBLICATIONS

U.S. Appl. No. 13/736,139 for an Electronic Device Enclosure, filed Jan. 8, 2013 (Chaney); 40 pages.

U.S. Appl. No. 13/771,508 for an Optical Redirection Adapter, filed Feb. 20, 2013 (Anderson); 26 pages.

U.S. Appl. No. 13/780,356 for a Mobile Device Having Object Identification Interface, filed Feb. 28, 2013 (Samek et al.); 21 pages.

U.S. Appl. No. 13/852,097 for a System and Method for Capturing and Preserving Vehicle Event Data, filed Mar. 28, 2013 (Barker et al.); 20 pages.

U.S. Appl. No. 13/902,110 for a System and Method for Display of Information Using a Vehicle-Mount Computer, filed May 24, 2013 (Hollifield); 29 pages.

U.S. Appl. No. 13/902,144, for a System and Method for Display of Information Using a Vehicle-Mount Computer, filed May 24, 2013 (Chamberlin); 23 pages.

U.S. Appl. No. 13/902,242 for a System for Providing a Continuous Communication Link With a Symbol Reading Device, filed May 24, 2013 (Smith et al.); 24 pages.

U.S. Appl. No. 13/912,262 for a Method of Error Correction for 3D Imaging Device, filed Jun. 7, 2013 (Jovanovski et al.); 33 pages.

U.S. Appl. No. 13/912,702 for a System and Method for Reading Code Symbols at Long Range Using Source Power Control, filed Jun. 7, 2013 (Xian et al.); 24 pages.

U.S. Appl. No. 13/922,339 for a System and Method for Reading Code Symbols Using a Variable Field of View, filed Jun. 20, 2013 (Xian et al.); 23 pages.

U.S. Appl. No. 13/927,398 for a Code Symbol Reading System Having Adaptive Autofocus, filed Jun. 26, 2013 (Todeschini); 24 pages.

U.S. Appl. No. 13/930,913 for a Mobile Device Having an Improved User Interface for Reading Code Symbols, filed Jun. 28, 2013 (Gelay et al.); 24 pages.

U.S. Appl. No. 13/933,415 for an Electronic Device Case, filed Jul. 2, 2013 (London et al.); 47 pages.

U.S. Appl. No. 13/947,296 for a System and Method for Selectively Reading Code Symbols, filed Jul. 22, 2013 (Rueblinger et al.); 29 pages.

U.S. Appl. No. 13/950,544 for a Code Symbol Reading System Having Adjustable Object Detection, filed Jul. 25, 2013 (Jiang); 28 pages.

U.S. Appl. No. 13/961,408 for a Method for Manufacturing Laser Scanners, filed Aug. 7, 2013 (Saber et al.); 26 pages.

U.S. Appl. No. 14/018,729 for a Method for Operating a Laser Scanner, filed Sep. 5, 2013 (Feng et al.); 24 pages.

U.S. Appl. No. 14/019,616 for a Device Having Light Source to Reduce Surface Pathogens, filed Sep. 6, 2013 (Todeschini); 23 pages.

U.S. Appl. No. 14/023,762 for a Handheld Indicia Reader Having Locking Endcap, filed Sep. 11, 2013 (Gannon); 31 pages.

U.S. Appl. No. 14/035,474 for Augmented-Reality Signature Capture, filed Sep. 24, 2013 (Todeschini); 33 pages.

U.S. Appl. No. 14/047,896 for Terminal Having Illumination and Exposure Control filed Oct. 7, 2013 (Jovanovski et al.); 32 pages.

U.S. Appl. No. 14/053,175 for Imaging Apparatus Having Imaging Assembly, filed Oct. 14, 2013 (Barber); 39 pages.

U.S. Appl. No. 14/055,234 for Dimensioning System, filed Oct. 16, 2013 (Fletcher); 26 pages.

U.S. Appl. No. 14/053,314 for Indicia Reader, filed Oct. 14, 2013 (Huck); 29 pages.

U.S. Appl. No. 14/065,768 for Hybrid System and Method for Reading Indicia, filed Oct. 29, 2013 (Meier et al.); 22 pages.

U.S. Appl. No. 14/074,746 for Self-Checkout Shopping System, filed Nov. 8, 2013 (Hejl et al.); 26 pages.

U.S. Appl. No. 14/074,787 for Method and System for Configuring Mobile Devices via NFC Technology, filed Nov. 8, 2013 (Smith et al.); 28 pages.

U.S. Appl. No. 14/087,190 for Optimal Range Indicators for Bar Code Validation, filed Nov. 22, 2013 (Hejl); 27 pages.

U.S. Appl. No. 14/345,735 for Optical Indicia Reading Terminal with Combined Illumination filed Mar. 19, 2014 (Ouyang); 19 pages.

U.S. Appl. No. 14/101,965 for High Dynamic-Range Indicia Reading System, filed Dec. 10, 2013 (Xian); 28 pages.

U.S. Appl. No. 14/118,400 for Indicia Decoding Device with Security Lock, filed Nov. 18, 2013 (Liu); 28 pages.

U.S. Appl. No. 14/150,393 for Incicia-reader Having Unitary Construction Scanner, filed Jan. 8, 2014 (Colavito et al.); 28 pages.

U.S. Appl. No. 14/154,207 for Laser Barcode Scanner, filed Jan. 14, 2014 (Hou et al.); 26 pages.

U.S. Appl. No. 14/154,915 for Laser Scanning Module Employing a Laser Scanning Assembly having Elastomeric Wheel Hinges, filed Jan. 14, 2014 (Havens et al.); 24 pages.

U.S. Appl. No. 14/158,126 for Methods and Apparatus to Change a Feature Set on Data Collection Devices, filed Jan. 17, 2014 (Berthiaume et al.); 53 pages.

U.S. Appl. No. 14/342,551 for Terminal Having Image Data Format Conversion filed Mar. 4, 2014 (Lui et al.); 25 pages.

U.S. Appl. No. 14/342,544 for Imaging Based Barcode Scanner Engine with Multiple Elements Supported on a Common Printed Circuit Board filed Mar. 4, 2014 (Liu et al.); 27 pages.

(56) References Cited

OTHER PUBLICATIONS

U.S. Appl. No. 14/257,174 for Reading Apparatus Having Partial Frame Operating Mode filed Apr. 21, 2014, (Barber et al.), 67 pages.
U.S. Appl. No. 14/200,405 for Indicia Reader for Size-Limited Applications filed Mar. 7, 2014 (Feng et al.); 42 pages.
U.S. Appl. No. 14/166,103 for Indicia Reading Terminal Including Optical Filter filed Jan. 28, 2014 (Lu et al.); 29 pages.
U.S. Appl. No. 14/274,858 for Mobile Printer With Optional Battery Accessory, filed May 12, 2014, (Marty et al.), 26 pages.
U.S. Appl. No. 14/264,173 for Autofocus Lens System for Indicia Readers filed Apr. 29, 2014, (Ackley et al.), 39 pages.
U.S. Appl. No. 14/230,322 for Focus Module and Components with Actuator filed Mar. 31, 2014 (Feng et al.); 92 pages.
U.S. Appl. No. 14/222,994 for Method and Apparatus for Reading Optical Indicia Using a Plurality of Data filed Mar. 24, 2014 (Smith et al.); 30 pages.
U.S. Appl. No. 14/231,898 for Hand-Mounted Indicia-Reading Device with Finger Motion Triggering filed Apr. 1, 2014 (Van Horn et al.); 36 pages.
U.S. Appl. No. 29/486,759 for an Imaging Terminal, filed Apr. 2, 2014 (Oberpriller et al.); 8 pages.
U.S. Appl. No. 29/436,337 for an Electronic Device, filed Nov. 5, 2012 (Fitch et al.); 19 pages.
U.S. Appl. No. 29/458,405 for an Electronic Device, filed Jun. 19, 2013 (Fitch et al.); 22 pages.
U.S. Appl. No. 29/459,620 for an Electronic Device Enclosure, filed Jul. 2, 2013 (London et al.); 21 pages.
U.S. Appl. No. 29/459,681 for an Electronic Device Enclosure, filed Jul. 2, 2013 (Chaney et al.); 14 pages.
U.S. Appl. No. 29/459,785 for a Scanner and Charging Base, filed Jul. 3, 2013 (Fitch et al.); 21 pages.
U.S. Appl. No. 29/459,823 for a Scanner, filed Jul. 3, 2013 (Zhou et al.); 13 pages.
U.S. Appl. No. 29/468,118 for an Electronic Device Case, filed Sep. 26, 2013 (Oberpriller et al.); 44 pages.
Extended Search Report in counterpart European Application No. 15165284.9 dated Oct. 14, 2015, pp. 1-7.

* cited by examiner

INDICIA-READER HOUSING WITH AN INTEGRATED OPTICAL STRUCTURE

FIELD OF THE INVENTION

The present invention relates to the field of indicia readers and, more specifically, to an indicia-reader's imaging engine with a housing having an integrated optical structure.

BACKGROUND

Generally, indicia readers (e.g., barcode scanners) fall into one of three categories: wand scanners, laser scanners, and imaging barcode readers.

Wand scanners generally include a light source and photodetector housed in a pen-shaped housing. A user drags the wand reader across a code symbol (e.g., a barcode), and a signal is generated that represents the bar-space pattern of the barcode.

Laser scanners typically include a laser diode and lens combination to generate a collimated light beam. The beam is swept back-and-forth across a barcode by a reciprocating mirror. The light reflected from the barcode is collected and sensed by a photodetector. The result is an electronic signal that corresponds to the bar-space pattern of the barcode.

Imaging indicia readers (i.e., barcode readers) include an image sensor (e.g., CCD) and a group of lenses (i.e., lens group) for focusing the image of a target (i.e., barcode) onto the image sensor. The image sensor captures a digital picture of the barcode, and a processor running algorithms detects and decodes the barcode from the image. The optical subsystems (i.e., modules) in an imaging barcode reader responsible for creating a good image of a barcode is known as the imaging engine.

Most thin-profile, hand-held, mobile computing devices (e.g., smart-phones) now have integrated cameras that can be used as the imaging engine for indicia reading, and numerous applications for barcode scanning have been developed for these devices. While these applications perform reasonably well for the casual user, they lack the features, functions, and performance present in dedicated imaging barcode readers. Illumination, alignment, and image quality may all suffer when using a mobile computing device's camera as the imaging engine for barcode scanning.

Because most users want to carry only one mobile computing device, they will be reluctant to trade their mobile device for a dedicated indicia reader. A need, therefore, exists for a dedicated imaging indicia reader that is integrated within a hand-held mobile computing device. This integration, however, puts severe limitations on the imaging indicia reader's design. Unique design approaches and construction methods must be combined to allow for such novel integration. One such approach incorporates an optical structure within the housing of the indicia reading module.

SUMMARY

Accordingly, in one aspect, the present invention embraces an imaging engine for an indicia reader. The imaging engine includes three optical modules: (i) an imaging module for capturing an image of the imaging engine's field of view, (ii) an aiming module for projecting a visible aligning pattern onto a target in order to provide information regarding the imaging engine's field of view and to help align the image captured by the imaging module, and (iii) an illuminating module for projecting light onto the target to illuminate the imaging engine's field of view. The modules are held by a housing configured to provide support and alignment. The housing also includes an integrated optical structure.

In an exemplary embodiment, the imaging engine's imaging module includes an image sensor and one or more imaging-module lenses. The housing's integrated optical structure is configured as a housing imaging lens. The combination of the housing imaging lens and one or more imaging-module lenses form a lens group. This lens group is used to render (i.e., focus) an image onto the image sensor.

In another exemplary embodiment, the imaging engine's aiming module includes an aiming-module light source for illuminating an aiming-module aperture positioned in front of the aiming-module light source. The housing's integrated optical structure is configured as a housing aiming lens and is positioned in front of the aiming-module aperture in order to project an image of the aiming-module aperture onto the target.

In another exemplary embodiment, the imaging engine's aiming-module light source is a light emitting diode.

In another exemplary embodiment, the imaging engine's aiming-module light source is a laser diode.

In another exemplary embodiment, the imaging engine's aiming module includes an aiming-module light source positioned behind a housing aiming lens. The housing aiming lens is part of the housing's integrated optical structure and is configured to create a visible aligning pattern on the target.

In another exemplary embodiment, the imaging engine's aiming module includes a laser diode that is positioned behind a housing aiming lens. The housing aiming lens is part of the housing's integrated optical structure and is configured to create a visible aligning pattern on the target.

In another exemplary embodiment, the imaging engine's aiming module includes a light emitting diode that is positioned behind a housing aiming lens. The housing aiming lens is part of the housing's integrated optical structure and is configured to create a visible aligning pattern on the target.

In another exemplary embodiment, the imaging engine's illuminating module includes an illuminating-module light source positioned behind a housing illuminating lens. The housing illuminating lens is part of the housing's integrated optical structure and is configured to provide uniform illumination within the imaging engine's field of view.

In another exemplary embodiment, the imaging engine's illuminating module includes a light emitting diode positioned behind a housing illuminating lens. The housing illuminating lens is part of the housing's integrated optical structure and is configured to provide uniform illumination within the imaging engine's field of view.

In another exemplary embodiment, the imaging engine's housing is an optically transparent material.

In another exemplary embodiment, the imaging engine's optically transparent housing is polycarbonate.

In another exemplary embodiment, the imaging engine's optically transparent housing is polymethyl methacrylate (PMMA).

In yet another exemplary embodiment, the imaging engine's housing is formed of two materials. A first molded material provides structural support for the housing. The first molded material having glass fibers added to improve the structural strength. Pigment is also added to block light and minimize unwanted stray light between optical modules. A second molded optically transparent material forms the housing's integrated optical structure. The second material has high optical clarity and is formed with precise surface profile control.

In another aspect, the present invention embraces an indicia-reading imaging engine including the following: (i) an imaging module, (ii) an aiming module, (iii) an illuminating module, and (iv) a housing. The imaging module captures images of the imaging engine's field of view and includes an image sensor and one or more imaging-module lenses. The aiming module projects a visible aligning pattern onto a target to facilitate alignment of the image captured by the imaging module. The visible aligning pattern corresponds to an aiming-module aperture and provides information regarding the imaging engine's field of view. The illumination module projects light via an illuminating-module light source onto the target to highlight the imaging engine's field of view. The housing is dual purposed. First, it provides support and alignment for the imaging module, the aiming module, and the illuminating module. It also has integrated, optically-transparent optical-structures that correspond to the various modules.

At least one of the housing's integrated, optically-transparent optical-structures is configured as a housing imaging lens. This lens, when combined with the one or more imaging-module lenses, form a lens group to render an image onto the image sensor.

At least one of the housing's integrated optically-transparent optical-structures is configured as a housing aiming lens. This lens is positioned in front of the aiming-module aperture in order to project the aiming-module aperture's image onto the target.

At least one of the housing's integrated, optically-transparent optical-structures is configured as a housing illuminating lens. This lens is positioned in front of the illuminating-module light source in order to provide uniform illumination within the imaging engine's field of view.

In an exemplary embodiment, the indicia-reading imaging engine's housing imaging lens is a meniscus lens.

In another exemplary embodiment, the indicia-reading imaging engine's housing aiming lens is positioned in front of the aiming-module aperture and is a bi-convex lens.

In another exemplary embodiment, the indicia-reading imaging engine's housing illuminating lens is positioned in front of the illuminating-module light source and is a plano-convex lens.

In another exemplary embodiment, the indicia-reading imaging engine's housing illuminating lens is positioned in front of the illuminating-module light source and is a non-rotational aspheric lens.

In yet another exemplary embodiment, the indicia-reading imaging engine's housing includes (i) a first co-molded material to provide support and alignment for the imaging module, the aiming module, and the illuminating module, the housing having glass fiber added to improve the structural strength and pigment added to block light, and (ii) a second co-molded material to provide the integrated, optically-transparent optical-structures with high optical clarity and precise surface profile control.

The foregoing illustrative summary, as well as other exemplary objectives and/or advantages of the invention, and the manner in which the same are accomplished, are further explained within the following detailed description and its accompanying drawings.

DETAILED DESCRIPTION

Figure 1:
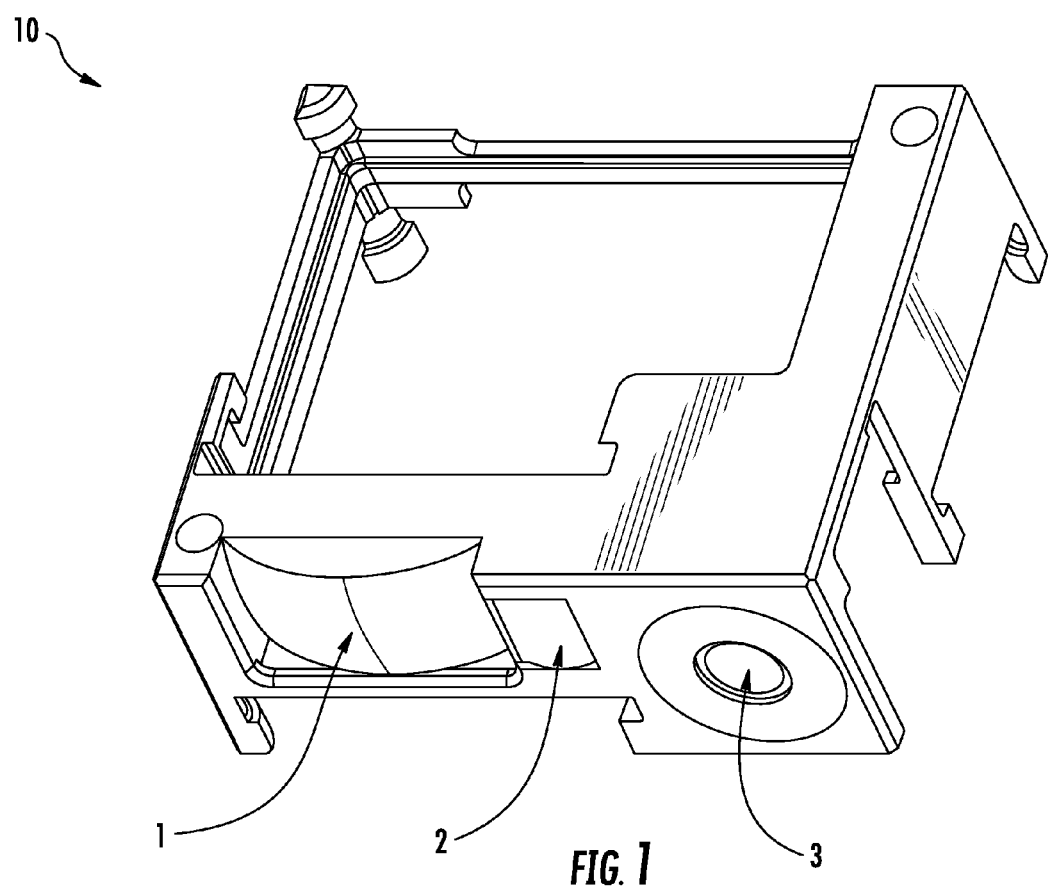
FIG. 1 graphically depicts an exemplary housing for an imaging engine.

The present invention embraces an imaging engine for an indicia reader. The imaging engine includes (i) an imaging module, (ii) an aiming module, (iii) an illuminating module, and (iv) a housing. The imaging module captures images of the imaging engine's field of view. The aiming module projects a visible aligning pattern onto a target to provide information regarding the imaging engine's field of view and facilitates alignment of the captured image. The illuminating module projects light onto the target to illuminate the imaging engine's field of view, which helps with imaging. The housing has dual purposes. First, it provides support and alignment for the imaging module, the aiming module, and the illuminating module. Second, it includes an integrated optical structure that aids the modules in their functions.

Mobile computing devices (e.g., a personal data assistant or a portable data terminal) may be integrated with dedicated indicia readers for reading indicia (e.g., barcodes) or for capturing document information (e.g., optical character recognition). Both of these applications require high quality images. Images that are misaligned or poorly illuminated may make decoding more difficult. As a result, an imaging engine for these devices includes several modules that help provide the best possible image of the target.

One module in the imaging engine is the imaging module. The imaging module creates an image of a target (e.g., barcode). A group of lenses (i.e., lens group) in this module creates an image of a target (positioned in front of the lens group) on an image sensor (positioned behind the lens group) mounted to a circuit board. The lens group is designed with an optical power, a depth of field, and a field of view suitable for imaging indicia (e.g., barcodes). Typically, the individual lenses of the lens group are assembled into a barrel suitable for mounting in front of the image sensor. This barrel is installed in a holder in front of the image sensor. This holder itself may be mounted to the same circuit board as the image sensor. The circuit board may be mounted into a housing with other circuit boards that form the indicia reader. This approach, while straightforward, has added size and weight and may be unsuitable for the integration into a small hand-held mobile computing device. The size and weight of the imaging engine may be reduced by eliminating parts through the use of dual purpose housing. That is, a housing with an integrated optical structure.

An integrated optical structure may be formed into the housing if high quality optical materials are used in its construction. For example, a material with high optical transmission and low optical dispersion such as polycarbonate or polymethyl methacrylate (PMMA) may be molded (e.g., injection molded) to form a housing with an optical structure including lenses. Alternatively a co-molding process could be used with two materials. One material, having high optical clarity and precise surface profile control may form the optical structures. The other material, having glass fibers added for structural strength and pigment for light blocking, may have other advantageous properties (e.g., strength) required by the housing. The housing's integrated optical structure may be configured as a housing imaging lens. This lens may replace the first lens in the lens group for the imaging module. In this way, the one or more imaging-module lenses and the housing imaging lens form a lens group that can render an image onto the image sensor. In an exemplary embodiment, this housing imaging lens is a meniscus lens formed into the front wall of the housing. One or two additional lenses between the housing imaging lens and the image sensor are used to achieve the total combined optical power and aberration control necessary to form a good target image with the required resolution for decoding.

The illuminating module uses an illuminating-module light source (e.g., light emitting diode) to highlight the imaging engine's field of view. Without this illumination, the image captured by the image sensor would have low contrast and would be noisy, neither quality being conducive to algorithmic decoding. The light from the illuminating-module light source is focused by a lens formed into the integrated optical structure of the housing. This lens (i.e., housing illuminating lens) is positioned in front of the illumination-module light source in order to provide uniform illumination within the field of view of the imaging engine. The lens may be a plano-convex lens. The convex surface of the lens may be a non-rotational aspheric (i.e., free form) surface to redistribute the light source's light uniformly within the field of view. In some embodiments, an aperture may be used between the illuminating-module light source and the housing illuminating lens in order to limit the extent of the illumination. Again, this aperture can be achieved by co-molding of non-transparent material. The aperture can provide a well-defined illumination pattern edge to improve user experience. The aperture may also reduce the potential for light crosstalk between the imaging module optics.

The aiming module creates a visible aligning pattern on the target. An operator may use this aligning pattern to position the indicia reader with respect to the target. The aligning pattern may be any shape or form that allows proper positioning. For example, the pattern may be a line, a crosshair, a frame, or any combination of these forms. The aligning pattern gives the operator a visual indication of the center, orientation, width, and height of the imaging engine's field of view. In this way, the operator may align the indicia reader with the target (e.g., barcode) to facilitate decoding.

The aiming module may be one of two forms: an LED (i.e., light emitting diode) aimer or a laser aimer. As the name implies, the aiming-module light source is a laser, and the aiming-module light source for the LED aimer is an LED. The type of aimer used depends on the applications. Laser aimers for example typically have more range than LED aimers due to the high intensity of the laser light.

In an exemplary embodiment of the aiming module, a collimating lens is positioned in front of a laser to collimate the laser's light. A diffractive optical element (i.e., DOE) is positioned in front of the collimating lens (i.e., between the source and the target) to form an aligning pattern on the target.

In another embodiment, the aiming-module light source (i.e., LED or laser diode) is positioned behind an aiming-module aperture, the aperture corresponding to the aligning pattern. The housing's integrated optical structure is configured to form a housing aiming lens, and the housing aiming lens is used to project an image of the aiming-module aperture onto the target.

In still another embodiment, no aiming-module aperture is used. The housing aiming lens is used to form an aligning pattern (e.g., line) on the target. Here, the housing aiming lens is a bi-convex lens molded into the front wall of the housing directly in front of the aiming-module light source (i.e., LED or laser diode). The inner convex surface is a rotationally symmetric surface that collimates the light from the LED. The outer convex surface (i.e., target side) is an aspherical toric surface that spreads the collimated light to form a uniform line pattern on the target. Combinations of toric segments with wedges could generate multi-line patterns, frame patterns, or other aligning patterns.

An exemplary housing for an imaging engine is shown in FIG. 1. The housing 10 is molded from an optically transparent material and has an integrated optical structure. Lenses are molded into the housing 10 for the various modules.

A housing illuminating lens 1 is a plano-convex lens that redistributes the illuminating-module light source LED into a well-defined area with a uniform illumination level.

A housing aiming lens 2 is a bi-convex lens integrated into the front wall of the housing 10. The inner convex surface is rotationally symmetric and serves to collimate the light from the aiming-module light source. The outer convex surface (i.e., towards the target) is an aspherical toric surface that spreads the collimated light to form a uniform line pattern on the target. This line pattern serves as the visible aligning pattern, allowing the operator to align the imaging engine with the target.

A housing imaging lens 3 is a meniscal lens formed into the front wall of the housing 10 and serves as the first element of the imaging lens assembly. This lens, when combined with one or two more lens elements, achieves the proper optical power and aberration control to form a satisfactory image with the required optical resolution on the image sensor.

Figure 2:
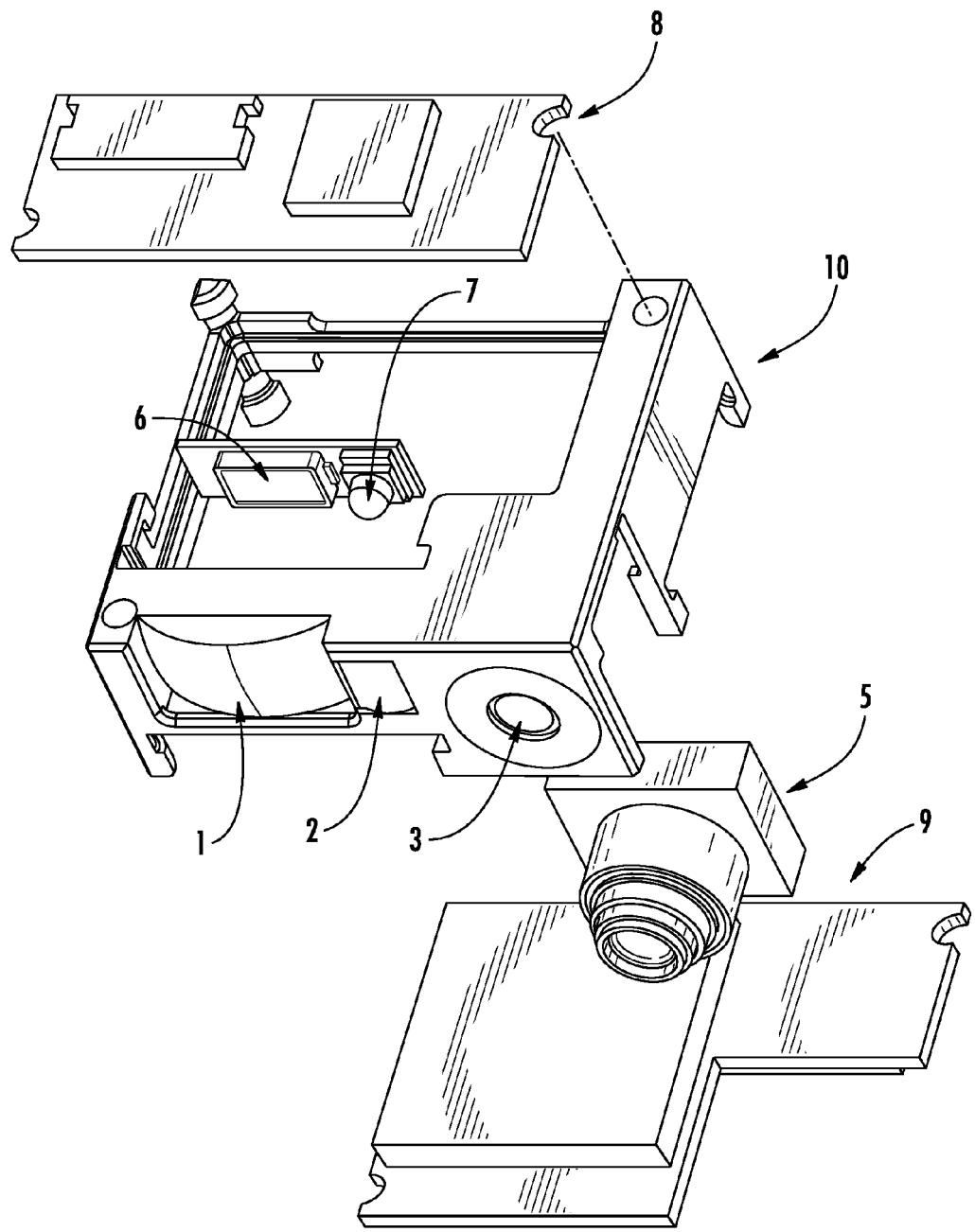
FIG. 2 graphically depicts an exploded view of an exemplary housing and the various modules for an imaging engine.

As shown in FIG. 2, various modules are mounted (e.g., snap-fit) into the housing so that the modules line up with their respective optical structures. The housing provides support and alignment for the imaging module 5, the illuminating module 6, and the aiming module 7. The housing 10 also supports circuit subassemblies like the interface subassembly 8 and the processing subassembly 9. Folded rigid flex cables are used to connect the modules and the circuit subassemblies. This approach minimizes the interconnections between circuit boards and reduces size. The entire indicia reader is small enough to fit within a hand-held mobile computing device (e.g., smart phone).

There are many advantages to the approach of using a housing with an integrated optical structure. This approach reduces part count and improves tolerances as some lenses are integrated within the housing's integrated optical structure. It reduces the difficulty of assembly but simplifies alignment, as well as reducing cost, weight, and complexity.

To supplement the present disclosure, this application incorporates entirely by reference the following commonly assigned patents, patent application publications, and patent applications:

U.S. Pat. Nos. 6,832,725; 7,128,266;
7,159,783; 7,413,127;
7,726,575; 8,294,969;
8,317,105; 8,322,622;
8,366,005; 8,371,507;
8,376,233; 8,381,979;
8,390,909; 8,408,464;
8,408,468; 8,408,469;
8,424,768; 8,448,863;
8,457,013; 8,459,557;
8,469,272; 8,474,712;
8,479,992; 8,490,877;
8,517,271; 8,523,076;
8,528,818; 8,544,737;
8,548,242; 8,548,420;
8,550,335; 8,550,354;
8,550,357; 8,556,174;
8,556,176; 8,556,177;
8,559,767; 8,599,957;
8,561,895; 8,561,903;
8,561,905; 8,565,107;
8,571,307; 8,579,200;
8,583,924; 8,584,945;
8,587,595; 8,587,697;
8,588,869; 8,590,789;
8,596,539; 8,596,542;
8,596,543; 8,599,271;

8,599,957; 8,600,158;
8,600,167; 8,602,309;
8,608,053; 8,608,071;
8,611,309; 8,615,487;
8,616,454; 8,621,123;
8,622,303; 8,628,013;
8,628,015; 8,628,016;
8,629,926; 8,630,491;
8,635,309; 8,636,200;
8,636,212; 8,636,215;
8,636,224; 8,638,806;
8,640,958; 8,640,960;
8,643,717; 8,646,692;
8,646,694; 8,657,200;
8,659,397; 8,668,149;
8,678,285; 8,678,286;
8,682,077; 8,687,282;
International Publication No. 2013/163789;
International Publication No. 2013/173985;
International Publication No. 2014/019130;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2011/0169999;
U.S. Patent Application Publication No. 2011/0202554;
U.S. Patent Application Publication No. 2012/0111946;
U.S. Patent Application Publication No. 2012/0138685;
U.S. Patent Application Publication No. 2012/0168511;
U.S. Patent Application Publication No. 2012/0168512;
U.S. Patent Application Publication No. 2012/0193407;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0056285;
U.S. Patent Application Publication No. 2013/0070322;
U.S. Patent Application Publication No. 2013/0075168;
U.S. Patent Application Publication No. 2013/0082104;
U.S. Patent Application Publication No. 2013/0175341
U.S. Patent Application Publication No. 2013/0175343;
U.S. Patent Application Publication No. 2013/0200158;
U.S. Patent Application Publication No. 2013/0256418;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0278425;
U.S. Patent Application Publication No. 2013/0287258;
U.S. Patent Application Publication No. 2013/0292474;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306730;
U.S. Patent Application Publication No. 2013/0306731;
U.S. Patent Application Publication No. 2013/0306734;
U.S. Patent Application Publication No. 2013/0307964;
U.S. Patent Application Publication No. 2013/0313324;
U.S. Patent Application Publication No. 2013/0313325;
U.S. Patent Application Publication No. 2013/0313326;
U.S. Patent Application Publication No. 2013/0327834;
U.S. Patent Application Publication No. 2013/0341399;
U.S. Patent Application Publication No. 2013/0342717;
U.S. Patent Application Publication No. 2014/0001267;
U.S. Patent Application Publication No. 2014/0002828;
U.S. Patent Application Publication No. 2014/0008430;
U.S. Patent Application Publication No. 2014/0008439;
U.S. Patent Application Publication No. 2014/0021256;
U.S. Patent Application Publication No. 2014/0025584;
U.S. Patent Application Publication No. 2014/0027518;
U.S. Patent Application Publication No. 2014/0034723;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061305;
U.S. Patent Application Publication No. 2014/0061306;
U.S. Patent Application Publication No. 2014/0061307;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. patent application Ser. No. 13/367,978 for a Laser Scanning Module Employing An Elastomeric U-Hinge Based Laser Scanning Assembly, filed Feb. 7, 2012 (Feng et al.);
U.S. patent application Ser. No. 13/400,748 for a Laser Scanning Bar Code Symbol Reading System Having Intelligent Scan Sweep Angle Adjustment Capabilities Over The Working Range Of The System For Optimized Bar Code Symbol Reading Performance, filed Feb. 21, 2012 (Wilz);
U.S. patent application Ser. No. 13/736,139 for an Electronic Device Enclosure, filed Jan. 8, 2013 (Chaney);
U.S. patent application Ser. No. 13/750,304 for Measuring Object Dimensions Using Mobile Computer, filed Jan. 25, 2013;
U.S. patent application Ser. No. 13/771,508 for an Optical Redirection Adapter, filed Feb. 20, 2013 (Anderson);
U.S. patent application Ser. No. 13/780,158 for a Distraction Avoidance System, filed Feb. 28, 2013 (Sauerwein);
U.S. patent application Ser. No. 13/780,196 for Android Bound Service Camera Initialization, filed Feb. 28, 2013 (Todeschini et al.);
U.S. patent application Ser. No. 13/780,271 for a Vehicle Computer System with Transparent Display, filed Feb. 28, 2013 (Fitch et al.);
U.S. patent application Ser. No. 13/780,356 for a Mobile Device Having Object-Identification Interface, filed Feb. 28, 2013 (Samek et al.);
U.S. patent application Ser. No. 13/784,933 for an Integrated Dimensioning and Weighing System, filed Mar. 5, 2013 (McCloskey et al.);
U.S. patent application Ser. No. 13/785,177 for a Dimensioning System, filed Mar. 5, 2013 (McCloskey et al.);
U.S. patent application Ser. No. 13/792,322 for a Replaceable Connector, filed Mar. 11, 2013 (Skvoretz);
U.S. patent application Ser. No. 13/852,097 for a System and Method for Capturing and Preserving Vehicle Event Data, filed Mar. 28, 2013 (Barker et al.);
U.S. patent application Ser. No. 13/895,846 for a Method of Programming a Symbol Reading System, filed Apr. 10, 2013 (Corcoran);
U.S. patent application Ser. No. 13/902,110 for a System and Method for Display of Information Using a Vehicle-Mount Computer, filed May 24, 2013 (Hollifield);

U.S. patent application Ser. No. 13/902,144, for a System and Method for Display of Information Using a Vehicle-Mount Computer, filed May 24, 2013 (Chamberlin);

U.S. patent application Ser. No. 13/902,242 for a System For Providing A Continuous Communication Link With A Symbol Reading Device, filed May 24, 2013 (Smith et al.);

U.S. patent application Ser. No. 13/912,262 for a Method of Error Correction for 3D Imaging Device, filed Jun. 7, 2013 (Jovanovski et al.);

U.S. patent application Ser. No. 13/912,702 for a System and Method for Reading Code Symbols at Long Range Using Source Power Control, filed Jun. 7, 2013 (Xian et al.);

U.S. patent application Ser. No. 13/922,339 for a System and Method for Reading Code Symbols Using a Variable Field of View, filed Jun. 20, 2013 (Xian et al.);

U.S. patent application Ser. No. 13/927,398 for a Code Symbol Reading System Having Adaptive Autofocus, filed Jun. 26, 2013 (Todeschini);

U.S. patent application Ser. No. 13/930,913 for a Mobile Device Having an Improved User Interface for Reading Code Symbols, filed Jun. 28, 2013 (Gelay et al.);

U.S. patent application Ser. No. 13/933,415 for an Electronic Device Case, filed Jul. 2, 2013 (London et al.);

U.S. patent application Ser. No. 13/947,296 for a System and Method for Selectively Reading Code Symbols, filed Jul. 22, 2013 (Rueblinger et al.);

U.S. patent application Ser. No. 13/950,544 for a Code Symbol Reading System Having Adjustable Object Detection, filed Jul. 25, 2013 (Jiang);

U.S. patent application Ser. No. 13/961,408 for a Method for Manufacturing Laser Scanners, filed Aug. 7, 2013 (Saber et al.);

U.S. patent application Ser. No. 13/974,374 for Authenticating Parcel Consignees with Indicia Decoding Devices, filed Aug. 23, 2013 (Ye et al.);

U.S. patent application Ser. No. 14/018,729 for a Method for Operating a Laser Scanner, filed Sep. 5, 2013 (Feng et al.);

U.S. patent application Ser. No. 14/019,616 for a Device Having Light Source to Reduce Surface Pathogens, filed Sep. 6, 2013 (Todeschini);

U.S. patent application Ser. No. 14/023,762 for a Handheld Indicia Reader Having Locking Endcap, filed Sep. 11, 2013 (Gannon);

U.S. patent application Ser. No. 14/035,474 for Augmented-Reality Signature Capture, filed Sep. 24, 2013 (Todeschini);

U.S. patent application Ser. No. 14/047,896 for Terminal Having Illumination and Exposure Control filed Oct. 7, 2013 (Jovanovski et al.);

U.S. patent application Ser. No. 14/035,474 for Augmented-Reality Signature Capture, filed Sep. 24, 2013 (Todeschini);

U.S. patent application Ser. No. 14/050,515 for Hybrid-Type Bioptical, filed Oct. 10, 2013 (Edmonds et al.);

U.S. patent application Ser. No. 14/053,175 for Imaging Apparatus Having Imaging Assembly, filed Oct. 14, 2013 (Barber);

U.S. patent application Ser. No. 14/055,234 for Dimensioning System, filed Oct. 16, 2013 (Fletcher);

U.S. patent application Ser. No. 14/055,353 for Dimensioning System, filed Oct. 16, 2013 (Giordano et al.);

U.S. patent application Ser. No. 14/055,383 for Dimensioning System, filed Oct. 16, 2013 (Li et al.);

U.S. patent application Ser. No. 14/053,314 for Indicia Reader, filed Oct. 14, 2013 (Huck);

U.S. patent application Ser. No. 14/058,762 for Terminal Including Imaging Assembly, filed Oct. 21, 2013 (Gomez et al.);

U.S. patent application Ser. No. 14/062,239 for Chip on Board Based Highly Integrated Imager, filed Oct. 24, 2013 (Toa et al.);

U.S. patent application Ser. No. 14/065,768 for Hybrid System and Method for Reading Indicia, filed Oct. 29, 2013 (Meier et al.);

U.S. patent application Ser. No. 14/074,746 for Self-Checkout Shopping System, filed Nov. 8, 2013 (Hejl et al.);

U.S. patent application Ser. No. 14/074,787 for Method and System for Configuring Mobile Devices via NFC Technology, filed Nov. 8, 2013 (Smith et al.);

U.S. patent application Ser. No. 14/082,468 for Encoded Information Reading Terminal with Wireless Path Selection Capability, filed Nov. 18, 2013 (Wang et al.);

U.S. patent application Ser. No. 14/087,190 for Optimal Range Indicators for Bar Code Validation, filed Nov. 22, 2013 (Hejl);

U.S. patent application Ser. No. 14/093,484 for System for Capturing a Document in an Image Signal, filed Dec. 1, 2013 (Showering);

U.S. patent application Ser. No. 14/093,487 for Method and System Operative to Process Color Image Data, filed Dec. 1, 2013 (Li et al.);

U.S. patent application Ser. No. 14/093,490 for Imaging Terminal Having Image Sensor and Lens Assembly, filed Dec. 1, 2013 (Havens et al.);

U.S. patent application Ser. No. 14/093,624 for Apparatus Operative for Capture of Image Data, filed Dec. 2, 2013 (Havens et al.);

U.S. patent application Ser. No. 14/094,087 for Method and System for Communicating Information in an Digital Signal, filed Dec. 2, 2013 (Peake et al.);

U.S. patent application Ser. No. 14/101,965 for High Dynamic-Range Indicia Reading System, filed Dec. 10, 2013 (Xian);

U.S. patent application Ser. No. 14/107,048 for Roaming Encoded Information Reading Terminal, filed Dec. 16, 2013 (Wang et al.);

U.S. patent application Ser. No. 14/118,400 for Indicia Decoding Device with Security Lock, filed Nov. 18, 2013 (Liu);

U.S. patent application Ser. No. 14/138,206 for System and Method to Store and Retrieve Indentifier Associated Information, filed Dec. 23, 2013 (Gomez et al.);

U.S. patent application Ser. No. 14/143,399 for Device Management Using Virtual Interfaces, filed Dec. 30, 2013 (Caballero);

U.S. patent application Ser. No. 14/147,992 for Decoding Utilizing Image Data, filed Jan. 6, 2014 (Meier et al.);

U.S. patent application Ser. No. 14/150,393 for Incicia-reader Having Unitary Construction Scanner, filed Jan. 8, 2014 (Colavito et al.);

U.S. patent application Ser. No. 14/153,111 for Indicia Reading Terminal Including Frame Quality Evaluation Processing, filed Jan. 13, 2014 (Wang et al.);

U.S. patent application Ser. No. 14/153,142 for Imaging Apparatus Comprising Image Sensor Array having Shared Global Shutter Circuitry, filed Jan. 13, 2014 (Wang);

U.S. patent application Ser. No. 14/153,182 for System and Method to Manipulate an Image, filed Jan. 13, 2014 (Longacre et al.);

U.S. patent application Ser. No. 14/153,213 for Apparatus Comprising Image Sensor Array and Illumination Control, filed Jan. 13, 2014 (Ding);

U.S. patent application Ser. No. 14/153,249 for Terminal Operative for Storing Frame of Image Data, filed Jan. 13, 2014 (Winegar);

U.S. patent application Ser. No. 14/154,207 for Laser Barcode Scanner, filed Jan. 14, 2014 (Hou et al.);

U.S. patent application Ser. No. 14/154,915 for Laser Scanning Module Employing a Laser Scanning Assembly having Elastomeric Wheel Hinges, filed Jan. 14, 2014 (Havens et al.);

U.S. patent application Ser. No. 14/158,126 for Methods and Apparatus to Change a Feature Set on Data Collection Devices, filed Jan. 17, 2014 (Berthiaume et al.);

U.S. patent application Ser. No. 14/159,074 for Wireless Mesh Point Portable Data Terminal, filed Jan. 20, 2014 (Wang et al.);

U.S. patent application Ser. No. 14/159,509 for MMS Text Messaging for Hand Held Indicia Reader, filed Jan. 21, 2014 (Kearney);

U.S. patent application Ser. No. 14/159,603 for Decodable Indicia Reading Terminal with Optical Filter, filed Jan. 21, 2014 (Ding et al.);

U.S. patent application Ser. No. 14/160,645 for Decodable Indicia Reading Terminal with Indicia Analysis Functionality, filed Jan. 22, 2014 (Nahill et al.);

U.S. patent application Ser. No. 14/161,875 for System and Method to Automatically Discriminate Between Different Data Types, filed Jan. 23, 2014 (Wang);

U.S. patent application Ser. No. 14/165,980 for System and Method for Measuring Irregular Objects with a Single Camera filed Jan. 28, 2014 (Li et al.);

U.S. patent application Ser. No. 14/166,103 for Indicia Reading Terminal Including Optical Filter filed Jan. 28, 2014 (Lu et al.);

U.S. patent application Ser. No. 14/176,417 for Devices and Methods Employing Dual Target Auto Exposure filed Feb. 10, 2014 (Meier et al.);

U.S. patent application Ser. No. 14/187,485 for Indicia Reading Terminal with Color Frame Processing filed Feb. 24, 2014 (Ren et al.);

U.S. patent application Ser. No. 14/200,405 for Indicia Reader for Size-Limited Applications filed Mar. 7, 2014 (Feng et al.);

U.S. patent application Ser. No. 14/342,544 for Imaging Based Barcode Scanner Engine with Multiple Elements Supported on a Common Printed Circuit Board filed Mar. 4, 2014 (Liu et al.);

U.S. patent application Ser. No. 14/342,551 for Terminal Having Image Data Format Conversion filed Mar. 4, 2014 (Lui et al.); and U.S. patent application Ser. No. 14/345,735 for Optical Indicia Reading Terminal with Combined Illumination filed Mar. 19, 2014 (Ouyang).

* * *

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. An imaging engine for an indicia reader, comprising:
an imaging module for capturing an image of the imaging engine's field of view;
an aiming module for projecting a visible aligning pattern onto a target to provide information regarding the imaging engine's field of view and to facilitate alignment of the image captured by the imaging module;
an illuminating module for projecting light onto the target to illuminate the imaging engine's field of view; and
a housing configured to provide support and alignment for the imaging module, the aiming module, and the illuminating module, wherein at least a portion of the housing is (i) optically transparent and (ii) shaped to form an integrated optical structure for focusing light to/from the imaging module, the aiming module, and/or the illumination module.

2. The imaging engine according to claim 1, wherein:
the imaging module comprises an image sensor and one or more imaging-module lenses;
the housing's integrated optical structure includes a housing imaging lens; and
the one or more imaging-module lenses and the housing imaging lens form a lens group to render an image onto the image sensor.

3. The imaging engine according to claim 1, wherein:
the aiming module comprises an aiming-module light source for illuminating an aiming-module aperture positioned in front of the aiming-module light source, and
the housing's integrated optical structure includes a housing aiming lens that is positioned in front of the aiming-module light source in order to project an image of the aiming-module aperture onto the target.

4. The imaging engine according to claim 3, wherein the aiming-module light source is a light emitting diode.

5. The imaging engine according to claim 3, wherein the aiming-module light source is a laser diode.

6. The imaging engine according to claim 1, wherein the aiming module comprises an aiming-module light source positioned behind the housing's integrated optical structure to create a visible aligning pattern on the target.

7. The imaging engine according to claim 6, wherein the aiming-module light source is a laser diode.

8. The imaging engine according to claim 6, wherein the aiming-module light source is a light emitting diode.

9. The imaging engine according to claim 1, wherein the illuminating module comprises an illuminating-module light source positioned behind the housing's integrated optical structure to provide uniform illumination within the imaging engine's field of view.

10. The imaging engine according to claim 9, wherein the illumination-module light source is a light emitting diode.

11. The imaging engine according to claim 1, wherein the housing is an optically transparent material.

12. The imaging engine according to claim 11, wherein the housing is polycarbonate.

13. The imaging engine according to claim 11, wherein the housing is polymethyl methacrylate (PMMA).

14. The imaging engine according to claim 1 wherein the housing is injection molded.

15. An indicia-reading imaging engine for integration within a hand-held mobile computing device, the indicia-reading imaging engine comprising:
an imaging module for capturing an image of the imaging engine's field of view, the imaging module comprising an image sensor and one or more imaging-module lenses;

an aiming module for projecting a visible aligning pattern onto a target via an aiming-module light source to provide information regarding the imaging engine's field of view and to facilitate alignment of the image captured by the imaging module;

an illuminating module for projecting light onto a target via an illuminating module light source to highlight the imaging engine's field of view; and an optically transparent housing (i) configured to provide support and alignment for the imaging module, the aiming module, and the illuminating module and (ii) shaped to form optical-structures that correspond to the imaging module, the aiming module, and the illuminating module, respectively;

wherein one of the housing's optical-structures is a housing imaging lens, and the one or more imaging-module lenses and the housing imaging lens form a lens group to render an image onto the image sensor;

wherein one of the housing's optical-structures is a housing aiming lens that is positioned in front of the aiming-module aperture in order to project the aiming-module aperture's image onto the target; and wherein one of the optical-structures is a housing illuminating lens that is positioned in front of the illuminating-module light source in order to provide uniform illumination within the imaging engine's field of view.

16. The indicia-reading imaging engine according to claim 15, wherein the housing imaging lens is a meniscus lens.

17. The indicia-reading imaging engine according to claim 15, wherein the housing aiming lens is a bi-convex lens.

18. The indicia-reading imaging engine according to claim 15, wherein the housing illuminating lens is a plano-convex lens.

19. The indicia-reading imaging engine according to claim 15, wherein the housing illuminating lens is a non-rotational aspheric lens.

20. The indicia-reading imaging engine according to claim 15, wherein the housing is injection molded.

* * * * *